United States Patent
Tanizaki et al.

(10) Patent No.: US 8,652,671 B2
(45) Date of Patent: Feb. 18, 2014

(54) SEPARATOR FOR BATTERY, AND BATTERY AND METHOD FOR PRODUCING BATTERY INCLUDING THE SAME

(75) Inventors: Saori Tanizaki, Osaka (JP); Norihiro Yamamoto, Osaka (JP); Yasushi Nakagiri, Kyoto (JP); Yasuyuki Shibano, Nara (JP)

(73) Assignee: Panasonic Corporation, Osaka (JP)

(*) Notice: Subject to any disclaimer, the term of this patent is extended or adjusted under 35 U.S.C. 154(b) by 55 days.

(21) Appl. No.: 13/254,296

(22) PCT Filed: Feb. 24, 2011

(86) PCT No.: PCT/JP2011/001072
§ 371 (c)(1),
(2), (4) Date: Sep. 1, 2011

(87) PCT Pub. No.: WO2011/108235
PCT Pub. Date: Sep. 9, 2011

(65) Prior Publication Data
US 2012/0107656 A1    May 3, 2012

(30) Foreign Application Priority Data
Mar. 4, 2010 (JP) ................. 2010-047437

(51) Int. Cl.
*H01M 2/00* (2006.01)
(52) U.S. Cl.
USPC .......................................... 429/94; 29/623.5
(58) Field of Classification Search
USPC ............... 429/144, 326, 324, 333, 94, 249; 29/623.5
See application file for complete search history.

(56) References Cited

U.S. PATENT DOCUMENTS

| | | | |
|---|---|---|---|
| 5,922,492 A | 7/1999 | Takita et al. | |
| 6,682,856 B1* | 1/2004 | Watanabe et al. | 429/326 |
| 2003/0072995 A1 | 4/2003 | Nark et al. | |
| 2004/0115523 A1 | 6/2004 | Hommura et al. | |
| 2005/0227132 A1* | 10/2005 | Hori et al. | 429/30 |
| 2006/0121267 A1 | 6/2006 | Tsuyumoto et al. | |
| 2006/0141238 A1 | 6/2006 | Sasaki et al. | |

(Continued)

FOREIGN PATENT DOCUMENTS

| CN | 101542779 A | 9/2009 |
|---|---|---|
| JP | 02-296840 | 12/1990 |

(Continued)

OTHER PUBLICATIONS

Chinese Office Action issued in the corresponding Chinese Patent Application No. 201180001283.6, mailed Jul. 19, 2013.

*Primary Examiner* — Mark F Huff
*Assistant Examiner* — Monique Wills
(74) *Attorney, Agent, or Firm* — McDermott Will & Emery LLP

(57) ABSTRACT

A separator for a battery includes a porous polymer film having a first surface and a second surface opposite to the first surface, wherein the first surface has openings distributed thereon communicating with pores of the porous polymer film, and the ratio of the total area of the openings to the area of the first surface is 89% or more and 96% or less. The diameters of the openings may be within the range of 0.8 μm or more and 40 μm or less. A region with a predetermined thickness including at least the first surface of the porous polymer film preferably includes at least one selected from the group consisting of polypropylene, and a copolymer of propylene and another copolymerizable monomer.

16 Claims, 2 Drawing Sheets

(56) References Cited

U.S. PATENT DOCUMENTS

| | | | |
|---|---|---|---|
| 2009/0011337 A1 | 1/2009 | Kajita et al. | |
| 2009/0246613 A1 | 10/2009 | Park et al. | |
| 2010/0062304 A1* | 3/2010 | Okanishi et al. | 429/30 |
| 2011/0111280 A1* | 5/2011 | Tamakoshi et al. | 429/144 |

FOREIGN PATENT DOCUMENTS

| | | |
|---|---|---|
| JP | 10-044348 | 2/1998 |
| JP | 10-055794 | 2/1998 |
| JP | 10-189049 | 7/1998 |
| JP | 2002-246000 | 8/2002 |
| JP | 2003-157824 | 5/2003 |
| JP | 2004-175104 | 6/2004 |
| JP | 2006-351365 | 12/2006 |
| JP | 2008-108492 | 5/2008 |
| JP | 2009-070609 | 4/2009 |
| JP | 2009-226746 | 10/2009 |
| WO | WO 2004/024808 A1 | 3/2004 |

* cited by examiner

F I G. 3
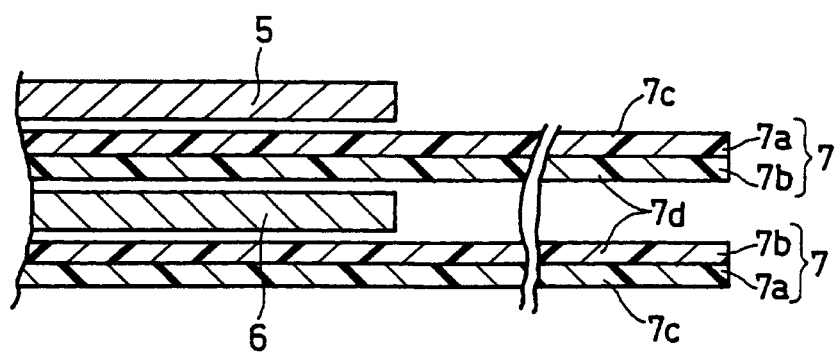

SEPARATOR FOR BATTERY, AND BATTERY AND METHOD FOR PRODUCING BATTERY INCLUDING THE SAME

RELATED APPLICATIONS

This application is the U.S. National Phase under 35 U.S.C. §371 of International Application No. PCT/JP2011/001072, filed on Feb. 24, 2011, which in turn claims the benefit of Japanese Application No. 2010-047437, filed on Mar. 4, 2010, the disclosures of which Applications are incorporated by reference herein.

TECHNICAL FIELD

The present invention relates to a separator for a battery, and a battery and a method for producing a battery including the same, and particularly relates to improvement of a separator.

BACKGROUND ART

Batteries with high capacity or high energy density represented by lithium ion secondary batteries are increasingly needed for various applications. However, if excessive current flows through such batteries, the battery temperature may rise abnormally. Development is under way for batteries that can provide improved safety in the event of such abnormality.

Batteries typically include a positive electrode, a negative electrode, a separator interposed therebetween, and an electrolyte. The separator has a porous structure because it is required in normal use to have ion conductivity as well as to electrically insulate the positive electrode from the negative electrode. The separator is sometimes required to soften and close the pores therein in the event of abnormality as mentioned above in the battery, thereby to lose its ion conductivity and stop the battery reaction (hereinafter referred to as a "shutdown property"). Separators made of polyolefins such as polyethylene and polypropylene are usually used as the separator having the shutdown property.

However, if the battery temperature rises even after the shutdown, meltdown occurs, that is, the separator melts down, and consequently, the positive and negative electrodes are short-circuited. It is preferable, therefore, to use a separator having good balance between the shutdown property and the resistance to meltdown. Patent Literature 1 focuses on separators made of polypropylene which has comparatively high melting point and good thermal stability among polyolefins. For example, a separator having a multilayer structure in which the outermost layers are a polypropylene layer and the intermediate layer(s) is a polyethylene layer is proposed.

Further, in response to the need for batteries with higher capacity, batteries including a wound electrode group are widely used. The wound electrode group is formed by spirally winding a belt-like positive electrode, a belt-like negative electrode, and a pair of separators insulating these from each other, using a winding core. Winding is usually performed by sandwiching the end portions of the pair of separators in a winding core, and winding with the positive electrode and the negative electrode being alternately interposed between the separators. Upon completion of winding, the sandwiching force around the portion of the separator from which winding is started is loosened, to remove the winding core.

However, if the slippage property of the separator surface is poor, the friction between the surface of the separator and the winding core is increased, and as a result, when removing the winding core, the separator is pulled together with the winding core or damaged. The displacement or damage of the separator leads to product defects involving current leakage.

In order to suppress the displacement of the separator, Patent Literature 2 proposes that a resin layer including polyethylene or fluorocarbon resin, the resin layer having good slippage property, be provided on the separator at a portion from which winding is started. Patent Literature 3 proposes that polypropylene containing at least 50 ppm of calcium stearate be used in the outer layer of a porous separator having a multilayer structure.

CITATION LIST

Patent Literature

[PTL 1] Japanese Laid-Open Patent Publication No. 2002-246000
[PTL 2] Japanese Laid-Open Patent Publication No. 2008-108492
[PTL 3] Japanese Laid-Open Patent Publication No. 2003-157824

SUMMARY OF INVENTION

Technical Problem

However, when polypropylene is used in the outermost layers as in Patent Literature 1, and an electrode group is formed by winding, because of the poor surface slippage property of the outermost layers, the winding core cannot be removed smoothly. As a result, the separator may be damaged at the portion from which winding is started, or displaced in the direction along which the winding core is removed, or protrudes out of the electrode group, starting from the portion from which winding is started. These troubles, even though the degree thereof is small, may cause a current leakage, leading to product defects.

A separator in which only the portion from which winding is started has a different layer structure as in Patent Literature 2 makes the number of steps for producing the separator increased or makes the production process complicated. Further, since the slippage property is imparted only to the portion from which winding is started, it is necessary to precisely align the separators with each other as well as to precisely align the separators with the positive electrode and/or the negative electrode. As a result, the productivity and yield of the battery is reduced, increasing the production cost.

By simply adding a small amount of calcium stearate as in Patent Literature 3, it is difficult to sufficiently improve the removability of the winding core from the wound electrode group. If the content of the calcium stearate is increased in order to improve the slippage property, the film moldability is deteriorated, which may impair the function of the separator. Further, in the winding, the separator is supplied to the winding apparatus by using a roller. If the slippage property of the separator surface is too good, slippage occurs between the roller and the surface of the separator, and thus the separator cannot be smoothly transferred by the roller. As a result, the winding is not performed smoothly, and winding displacement occurs, that is, the separator is wound in the state of being displaced. Therefore, in this technique also, the productivity and yield of the battery is reduced.

Solution to Problem

One of the purposes of the present invention is to improve the slippage property of the separator surface so that in forming a wound electrode group, the winding core can be smoothly removed from the electrode group, and thus the damage or displacement of the separator can be suppressed, thereby to reduce the occurrence of defects such as current leakage.

One aspect of the present invention relates to a separator for a battery, the separator including a porous polymer film having a first surface and a second surface opposite to the first surface, wherein the first surface has openings distributed thereon communicating with pores of the porous polymer film, and the ratio of the total area of the openings (i.e., the total of the areas of open regions) to an area of the first surface is 89% or more and 96% or less.

Another aspect of the present invention relates to a battery including: an electrode group formed by spirally winding a first electrode, a second electrode, and a pair of the above-mentioned separators insulating the first electrode from the second electrode; and a non-aqueous electrolyte, wherein the first electrode and the second electrode each include a belt-like current collector and an active material layer adhering to a surface of the current collector, and the inner surface of the innermost round of the electrode group is the first surface of the separator.

Yet another aspect of the present invention relates to a method for producing a battery, including the steps of:

preparing a first electrode including a belt-like first current collector and a first active material layer adhering to a surface of the first current collector, and a second electrode including a belt-like second current collector and a second active material layer adhering to a surface of the second current collector;

preparing a pair of the above-mentioned belt-like separators;

forming an electrode group by winding spirally the first electrode, the second electrode, and the separators, with the first electrode and the second electrode being arranged so as to be insulated from each other by the separators, end portions of the separators being sandwiched in a winding core, and the first surface of one of the separators being in contact with the peripheral surface of the winding core;

removing the winding core from the electrode group; and placing the electrode group in a battery case, together with a non-aqueous electrolyte.

While the novel features of the invention are set forth particularly in the appended claims, the invention, both as to organization and content, will be better understood and appreciated, along with other objects and features thereof, from the following detailed description taken in conjunction with the drawings.

Advantageous Effects of Invention

According to the present invention, since the ratio of the total area of openings communicating with the pores of the porous polymer film is set high at one surface thereof, even in forming a wound electrode group, the friction between the separator and the winding core can be reduced. As such, the winding core can be smoothly removed from the electrode group.

BRIEF DESCRIPTION OF DRAWINGS

FIG. 3 A cross-sectional schematic diagram showing how a separator having a two-layer structure according to another embodiment of the present invention and positive and negative electrodes are arranged.

DESCRIPTION OF EMBODIMENTS (Separator)

Figure 1:
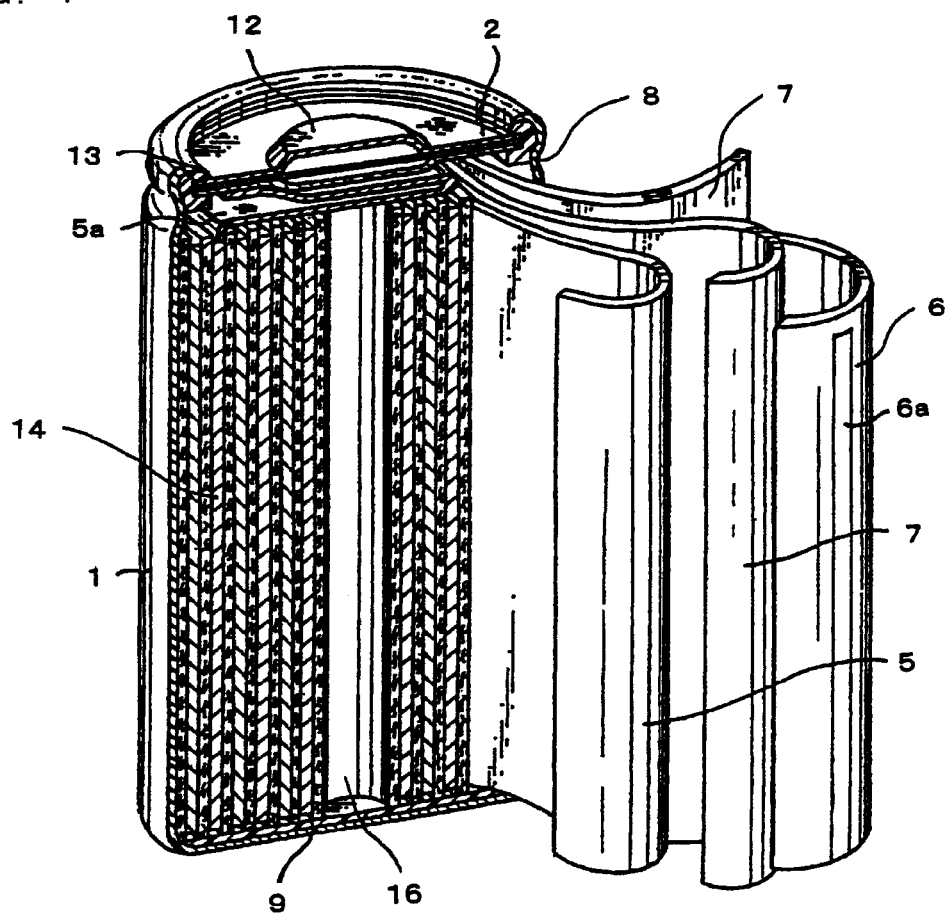
FIG. 1 A partially cut-away perspective view of one example of a battery according to the present invention.

A separator for a battery of the present invention includes a porous polymer film having a first surface and a second surface opposite to the first surface. The first surface has openings distributed thereon communicating with pores of the porous polymer film. The ratio of the total area of the openings to the area of the first surface (i.e., the opening ratio) is 89% or more and 96% or less. Similarly to the first surface, the second surface usually has openings distributed thereon communicating with the pores. The opening ratio of the second surface may be within or outside the above range.

Although description is made below mainly with respect to the first surface, the second surface may be the same as the first surface.

The separator as above, even if made of a material poor in slippage property, has a small frictional resistance at its surface (the first surface). Therefore, in forming a wound electrode group, by performing winding with the separator being arranged such that the first surface is in contact with the peripheral surface of the winding core, in other words, arranged such that the inner surface of the innermost round of the electrode group coincides with the first surface, the winding core can be smoothly removed from the electrode group after winding. As such, it is possible to effectively prevent the separator from being pulled or damaged in association with the removal of the winding core. This in turn can prevent current leakage associated with displacement or damage of the separator, and therefore, a highly reliable battery with excellent safety can be provided.

When the opening ratio is within the above range, the first surface maintains its slippage property with respect to the winding core, and at the same time, in supplying the separator by using a roller to a winding apparatus, can suppress the occurrence of excessive slippage with respect to the roller. It is possible, therefore, to smoothly supply the separator to the winding apparatus, and in the winding, to effectively prevent the winding displacement of the separator.

As described above, the separator has, at the first surface thereof, a good balance between an appropriate slippage property with respect to the winding core and an appropriate resistance to slippage (or friction) with respect to the roller, and thus has an appropriate slippage property required for forming an electrode group. It is possible, therefore, to suppress displacement or damage of the separator which may occur in removing the winding core from the electrode group, and winding displacement of the separator which may occur in the winding. As a result, the battery defect rate (i.e., the occurrence rate of defective batteries) can be significantly reduced, and the productivity and yield of the battery can be improved.

The opening ratio of the separator surface is not automatically determined by the porosity of the porous polymer film (e.g. the porosity in a region with a predetermined thickness including the first surface). In other words, even if the porosities are the same, the opening ratios vary greatly, depending on the pore shape, the pore diameter and/or the pore diameter distribution, and other factors. This means that even when the porosities are the same, the slippage property of the separator surface varies greatly, depending on the condition of the surface of the separator.

When the opening ratio of the first surface is below 89%, the surface slippage property is insufficient, and the separator is pulled or displaced in the direction along which the winding core is removed or damaged at a portion of the electrode group from which winding is started. When the opening ratio is above 96%, the surface slippage property is too good, and excessive slippage with respect to the roller for supplying the separator to the winding apparatus occurs, failing to smoothly supply the separator to the winding apparatus. As a result, winding displacement of the separator occurs in the winging.

The opening ratio of the first surface is preferably 90% or more, and more preferably 91% or more. Such an opening ratio can effectively suppress displacement or damage of the separator which may occur in association with the removal of the winding core. Further, the opening ratio is preferably 95% or less, and more preferably 94% or less. Such an opening ratio can effectively suppress slippage of the separator with respect to the roller. These upper limit values and lower limit values may be optionally combined with each other.

The opening ratio can be determined by photographing a predetermined region of the first surface under a scanning electron microscope (SEM), and thresholding the obtained image data. Specifically, the opening ratio can be determined by distinguishing openings A communicating with the pores of the porous polymer film from a non-opening region B other than A on the image data by thresholding, and calculating the ratio of the total area of the openings A to the area of the predetermined region, as a percentage.

The opening ratio can be controlled by adjusting the conditions for producing a porous polymer film, such as the film draw ratio (TD/MD ratio), stretching magnification, stretching magnification ratio in biaxial stretching, temperature in stretching, and particle size or content of a pore-forming agent. The porous polymer film may be an unstretched film, but is usually a stretched film. Therefore, it is advantageous to control the opening ratio by adjusting the conditions for stretching, such as the stretching magnification and stretching magnification ratio in biaxial stretching. Since the condition of the separator surface can be optimized by an easy and convenient method, for example, by adjusting the conditions for stretching, the increase in cost for separator production can be avoided.

It is preferable that the distribution width of the diameters of the openings on the first surface is narrow. For example, the diameters of the openings are preferably within the range of 0.8 μm or more and 40 μm or less. This means that all the openings chosen at random in the predetermined region of the first surface have diameters within the foregoing range.

When the distribution width of the diameters of the openings (i.e., the opening diameter range) of the first surface is narrow, the non-opening region is uniformly distributed. This can more effectively prevent a local formation of a large non-opening region on the surface, and thus, the winding core can be more smoothly removed from the electrode group. The opening diameter is preferably 1 μm or more, more preferably 2 μm or more, and particularly preferably 3 μm or more. The opening diameter is preferably 30 μm or less, more preferably 20 μm or less, and particularly preferably 15 μm or less. These upper limit values and lower limit values may be optionally combined with each other. Similarly to the opening ratio, the opening diameter range can be controlled by adjusting the above-mentioned conditions for producing a porous polymer film.

The opening diameter range can be determined by, for example, photographing a predetermined region of the first surface under an SEM, and calculating on the basis of the obtained SEM image. Specifically, it can be determined, for example, by the following method or a method in accordance therewith. First, among fields of view under an SEM at a resolution of 0.5 μm to 5 μm, a field of view in which 200 or more openings can be observed is selected, to record the photographic image thereof. In the recorded photograph, 200 or more openings are chosen at random, to measure the diameter of each opening. The measured opening diameters are classified into the following ranges: less than 0.5 μm; 0.5 μm or more and less than 1 μm; 1 μm or more and less than 3 μm; 3 μm or more and less than 10 μm; 10 μm or more and less than 15 μm; 15 μm or more and less than 30 μm; 30 μm or more and less than 45 μm; 45 μm or more and less than 60 μm; and 60 μm or more. In each of the foregoing ranges, the number of openings having an opening diameter within the range is counted. Based on this, the range in which all the openings chosen are distributed is determined. The range thus determined is defined as an opening diameter range.

The dynamic coefficient of friction on the first surface of the porous polymer film is, for example, 0.05 to 0.4, preferably 0.1 to 0.3, and more preferably 0.15 to 0.28. When a porous polymer film having a dynamic coefficient of friction within this range is used, the winding core can be removed more smoothly. It should be noted, however, the slippage property of the separator surface is dependent not only on the dynamic coefficient of friction but also on the above-mentioned opening ratio or opening diameter range. The dynamic coefficient of friction can be measured by, for example, a method specified in JISK 7125.

In the separator, in addition to the first surface, the second surface of the porous polymer film may also have an opening diameter range and/or dynamic coefficient of friction as described above.

There is no particular limitation on the material of the porous polymer film. The material thereof in the region with a predetermined thickness including at least the first surface may be a synthetic polymer, such as olefinic resin, acrylic resin, vinyl resin (e.g., styrenic resin and vinyl chloride resin), polyamide resin, polyimide resin, polyester resin, and silicone resin. These synthetic polymers may be used singly or in combination of two or more. The region with a predetermined thickness including the first surface is a region including the first surface and extending from the first surface to a predetermined depth in the porous polymer film.

In a preferred embodiment, the material of the porous polymer film in the region with a predetermined thickness including at least the first surface is a polymer having propylene as its constituent unit. Examples of the polymer include polypropylene, and a copolymer of propylene and another copolymerizable monomer. These polymers may be used singly or in combination of two or more. The copolymers may be random copolymers or block copolymers. By using the polymer having propylene as its constituent unit, an appropriate shutdown effect and an excellent thermal stability can be more reliably achieved.

Examples of the above-mentioned another copolymerizable monomer include: α-olefins other than propylene, such as ethylene, butene, and methylpentene; vinyl monomers, such as aromatic vinyl monomers (e.g., styrene) and vinyl cyanide monomers (e.g., acrylonitrile); and acrylic monomers, such as (meth)acrylic acid and (meth)acrylic acid esters. These copolymerizable monomers may be used singly or in combination of two or more. Among these copolymerizable monomers, α-olefins (e.g., ethylene and α-$C_{4-6}$ olefins) are usually preferred, and ethylene is particular preferred. The "(meth)acrylic acid" as used herein collectively refer to acrylic acid and methacrylic acid, and the "(meth)acrylic acid esters" as used herein collectively refer to acrylic acid esters and methacrylic acid esters. The content of another copolymerizable monomer(s) in the copolymer may be selected from the range, for example, from about 0.1 to about 40 mol %, and may be about 1 to about 30 mol %.

The porous polymer film may be a single layer film. Alternatively, the porous polymer film may be a multilayer film that includes a porous layer formed of the above-exemplified synthetic polymer(s) in the region with a predetermined thickness including at least the first surface.

A preferred porous polymer film is a multilayer film including a porous polypropylene layer. The porous polypropylene layer is a porous layer formed of the above-exemplified polymer(s) having propylene as its constituent unit.

The layer structure of the multilayer film is not particularly limited, and may be a two-layer structure, or a three- or more-layer structure including a pair of outermost layers and one or two or more intermediate layers interposed therebetween. The multilayer film may be a multilayer film comprising two or three or more porous polypropylene layers only, the layers differing in, for example, the composition of the material (e.g., the type of the copolymerizable monomer, and the copolymerization ratio) and the porosity, or may be a multilayer film comprising a porous polypropylene layer and a porous layer formed of another polymer. In the multilayer film, the layer having the first surface is preferably a porous polypropylene layer. Both the layer having the first surface and the layer having the second surface may be porous polypropylene layers. The multilayer film has preferably a two- to five-layer structure, more preferably a two- to four-layer structure, and particularly preferably two- or three-layer structure.

Examples of the above-mentioned another polymer in the multilayer film include olefinic resins whose main constituent monomer is an α-olefin other than propylene (e.g., ethylene and an α-$C_{4-6}$olefin) and fluorocarbon resins, and in addition, the above-exemplified synthetic polymers. The porous layer formed of another polymer is preferable in that it has a shutdown property. Therefore, among the above examples of another polymer, a polymer having a melting point or softening point of, for example, 100 to 200° C., and preferably 110 to 170° C. is preferred.

In view of the shutdown property and the performance of the separator, among the above examples of another polymer, olefinic resins are preferred, and a polymer containing an ethylene unit as its base, such as polyethylene and a copolymer containing an ethylene unit as its base, is particularly preferred. The content of the ethylene unit in the polymer is, for example, 70 mol % or more. Examples of the copolymer include ethylene-acetic acid vinyl copolymer, and an ethylene-propylene copolymer containing an ethylene unit as its base (e.g., a copolymer in which the content of the ethylene unit is 70 to 99.9 mol %). Examples of the polymer containing an ethylene unit as its base include low-density polyethylene (LDPE), linear low-density polyethylene (LLDPE), medium-density polyethylene (MDPE), high-density polyethylene (HDPE), and ultrahigh molecular weight polyethylene (e.g., polyethylene with weight average molecular weight of 1,000,000 or more).

A preferable multilayer film has a porous polypropylene layer and a porous polyethylene layer. The porous polyethylene layer is a porous layer formed of a polymer having ethylene as its constituent unit as exemplified above. Specifically, preferred as a film having a two-layer structure is a film including a porous polypropylene layer and a porous polyethylene layer laminated thereon. In a film having a three- or more-layer structure, at least one intermediate layer may be a porous polyethylene layer. The pair of the outermost layers may be a combination of a porous polypropylene layer and a porous polyethylene layer.

The porosity of the porous polymer film having a single layer structure is, for example, 30 to 80%, and preferably 35 to 70%. The porosity of the porous polypropylene layer can be selected from the similar range.

The porosity of the porous layer formed of another polymer, such as the porous polyethylene layer is, for example, 40 to 90%, and preferably 45 to 85%. The average pore diameter of the porous layer can be selected from the range, for example, from 0.01 to 10 µm, and is preferably 0.05 to 5 µm.

In view of the short circuit prevention and mechanical strength, the thickness of the separator is, for example, 5 µm or more, preferably 10 µm or more, and more preferably 12 µm or more. In view of ensuring battery capacity, the thickness of the separator is, for example, 35 µm or less, preferably 30 µm or less, and more preferably 25 µm or less. When the separator is a multilayer film, the thickness of each layer is adjusted so that the thickness of the multilayer film falls within the foregoing range. These upper limit values and lower limit values of the thickness may be optionally combined with each other.

In the separator of the present invention, the opening ratio of the first surface is high, and therefore, in order to obtain a sufficient shutdown effect, a smaller thickness of the region with a predetermined thickness including the first surface is advantageous. The thickness of the region is 40% or less, preferably 35% or less, and more preferably 30% or less of the thickness of the separator. For ensuring slippage property and obtaining good film formation, the thickness of the region is, for example, 10% or more, preferably 15% or more, and more preferably 20% or more of the thickness of the separator. These upper limit values and lower limit values may be optionally combined with each other. In the multilayer film, the above-mentioned region corresponds to the porous layer including the first surface, such as the porous polypropylene layer. For example, when the separator is a multilayer film composed of three or more layers, with the pair of outermost layers both being the porous polypropylene layers, the thickness of each of the outermost layers can be selected from the foregoing range, and the total thickness of the intermediate layer(s) is preferably 40% or more, and particularly preferably 45% or more, or alternatively 50% or more of the thickness of the separator.

Specifically, the thickness per one polypropylene layer in the multilayer film is, for example, 7 µm or less, preferably 6 µm or less, and more preferably 5 µm or less. For obtaining good film formation and ensuring slippage property, the thickness of the above-mentioned region is, for example, 1 µm or more, preferably 2 µm or more, and more preferably 3 µm or more. These upper limit values and lower limit values may be optionally combined with each other.

The porous polymer film can be formed by any conventional method, depending on its layer structure, material, and other factors. For example, it can be produced by forming a film using a constituent polymer and a pore forming agent by extrusion or coating, and then removing the pore forming agent by washing with water. For forming pores, the pore forming agent may be replaced with or may be used in combination with a nucleating agent (e.g., β-nucleating agent). In forming a film, stretching may be performed as needed. Alternatively, the porous polymer film can be formed by preparing an unstretched film using a constituent polymer, and subjecting the unstretched film to low-temperature stretching and/or high-temperature stretching. The multilayer film may be formed by co-extrusion or by employing extrusion and coating. Alternatively, the multilayer film may be formed by preparing each layer separately, and stacking and bonding the prepared layers to each other by a known fusing method (e.g., thermal fusing). In order to ensuring the slippage property at the first surface and the shutdown property as the separator, it is preferable to accurately control the opening ratio of the first surface and the pore structure of the separator.

Any commonly used additive (e.g., an antioxidant) may be contained in the porous polymer film. In a multilayer film, an additive may be contained in any of the layers. In a multilayer film with three or more layers, an antioxidant may be contained in the outermost layer. When the outermost layer contains an antioxidant, the separator can have improved oxidation resistance. Such an antioxidant is, for example, at least one selected from the group consisting of phenolic antioxidants, phosphoric acid-series antioxidants, and sulfur-containing antioxidants. A phenolic antioxidant may be used in combination with a phosphoric acid-series antioxidant and/or a sulfur-containing antioxidant. Sulfur-containing antioxidants have good compatibility with olefinic resins. Because of this, the antioxidant is preferably contained in a layer containing an olefinic resin, such as the porous polypropylene layer and the porous polyethylene layer.

Examples of the phenolic antioxidant include hindered phenol compounds, such as 2,6-di-t-butyl-p-cresol, 2,6-di-t-butyl-4-ethylphenol, triethyleneglycol-bis[3-(3-t-butyl-5-methyl-4-hydroxyphenyl)propionate], and n-octadecyl-3-(3,5-di-t-butyl-4-hydroxyphenyl)propionate. Examples of the sulfur-containing antioxidant include dilauryl thiodipropionate, distearyl thiodipropionate, and dimyristyl thiodipropionate. Preferred examples of the phosphoric acid-series antioxidant include tris(2,4-di-t-butylphenyl)phosphite.

The separator and the battery of the present invention are described below with reference to the accompanying drawings.

FIG. 1 is a partially cut-away perspective view showing the configuration of a cylindrical lithium ion secondary battery according to one embodiment of the present invention. The battery shown in FIG. 1 includes an electrode group 14 formed by spirally winding a first electrode 5, a second electrode 6, and a pair of separators 7 providing insulation therebetween. The electrode group 14 is accommodated together with a non-aqueous electrolyte (not shown) in a bottomed cylindrical battery case 1 made of metal.

In FIG. 1, the first electrode 5 is a positive electrode, and the second electrode 6 is a negative electrode.

A positive electrode lead terminal 5a is electrically connected to the first electrode (positive electrode) 5, and a negative electrode lead terminal 6a is electrically connected to the second electrode (negative electrode) 6. The electrode group 14 is placed in the battery case 1 together with a lower insulating plate 9, with the positive electrode lead terminal 5a being extended, and then, the end of the positive electrode lead terminal 5a is welded to a sealing plate 2 by, for example, laser welding. The sealing plate 2 includes a positive terminal 12 and a safety mechanism composed of a PTC element and an explosion-prevention valve (not shown).

The lower insulating plate 9 is positioned between the bottom of the electrode group 14 and the negative electrode lead terminal 6a extended downward from the electrode group 14, and the negative electrode lead terminal 6a is welded to the inner bottom surface of the battery case 1 by, for example, resistance welding. An upper insulating ring (not shown) is placed on the top of the electrode group 14, and an inwardly protruding step portion 8 is formed on the upper side surface of the battery case 1 above the upper insulating ring. By doing this, the battery group 14 is held in the battery case 1. Subsequently, a predetermined amount of non-aqueous electrolyte is injected into the battery case 1. On the step portion 8, the sealing plate 2 with a gasket 13 provided around its periphery is placed. The opening end of the battery case 1 is crimped inwardly to seal the battery case 1. A cylindrical lithium ion secondary battery is thus produced.

The electrode group 14 is formed by sandwiching the end portions (i.e., the end portion from which winding is started) of the pair of separators 7 in the longitudinal direction thereof in a winding core, winding the first electrode 5, the second electrode 6, and the pair of separators 7 providing insulation therebetween, with the first surface of one of the separators being in contact with the peripheral surface of the winding core, and then removing the winding core. Prior to the formation of the electrode group 14, the first electrode 5 including a belt-like first current collector and a first active material layer adhering to the surface thereof, and the second electrode 6 including a belt-like second current collector and a second active material layer adhering to the surface thereof are prepared.

Figure 2:
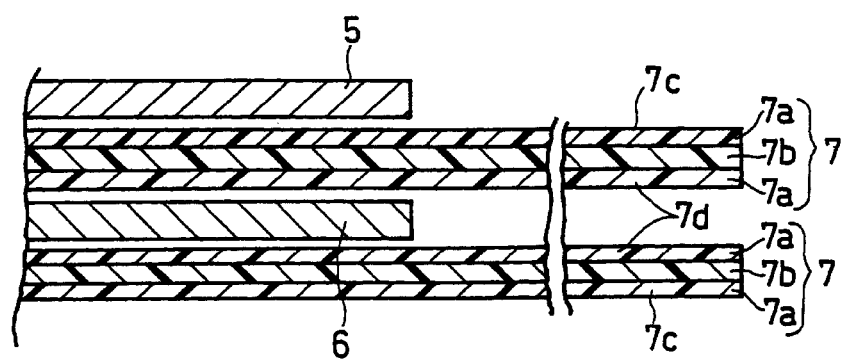
FIG. 2 A cross-sectional schematic diagram showing how a separator having a three-layer structure according to one embodiment of the present invention and positive and negative electrodes are arranged.

FIG. 2 shows a cross-sectional schematic diagram showing one embodiment of the separator 7. In FIG. 2, the separator 7 interposed between the first electrode (positive electrode) 5 and the second electrode (negative electrode) 6 is a porous polymer film having a three-layer structure including porous polypropylene layers 7a disposed as the pair of outermost layers and a porous polyethylene layer 7b disposed as an intermediate layer sandwiched therebetween. The porous polymer film has a first surface 7c facing the positive electrode 5 and a second surface 7d facing the negative electrode 6. Both the first surface 7c and the second surface 7d are the surface of the porous polypropylene layer 7a. As such, the first surface 7c and the second surface 7d each have openings distributed thereon communicating with pores of the porous polymer film, and have an opening ratio as described above.

Prior to formation of the electrode group, the separator of the present invention is prepared. The preparation of the separator may be performed at any time in the whole process without limitation, and may be performed before or after the preparation of the first electrode and second electrode. Alternatively, the preparation of the separator may be performed in parallel with the preparation of the first electrode and/or second electrode.

In FIG. 2, the end portions (the end portions from which winding is started) of the pair of separators 7 protrude from the ends of the first and second electrodes 5 and 6 in the longitudinal direction thereof. By performing winding with the end portions from which winding is started being sandwiched in a winding core or between a pair of winding cores, a portion that includes neither the first electrode 5 nor the second electrode 6 and comprises the end portions of the pair of separators 7 from which winding is started is formed near the winding axis of the electrode group. This portion comprising the end portions of the pair of separators 7 from which winding is started is shown in FIG. 1 as a separator portion 16. The separator portion 16 comprises at least one round of winding.

In the winding, the end portions from which winding is started are sandwiched in a winding core such that the first surfaces 7c of the pair of separators 7 are brought into contact with the winding core. By subsequent winding around the winding core used as the axis, the peripheral surface of the winding core comes in contact only with the first surface 7c with good slippage property, and the inner surface of the innermost round of the electrode group coincides with the first surface 7c. Upon completion of winding of the electrode group, the sandwiching force applied to the separators 7 is loosened, to remove the winding core. Since the peripheral surface of the winding core is in contact only with the first surface 7c, the winding core can be extremely smoothly removed. As such, it is possible to effectively prevent the separator from being displaced or pulled in the direction along which the winding core is removed. As a result, the current leakage can be reduced, and the reduction in yield can be suppressed.

The porous polymer film shown in FIG. 2 has an outermost layer being a porous polypropylene layer, and thus can provide an excellent thermal stability as well as an appropriate shutdown effect. Further, it has an intermediate layer being a porous polyethylene layer, and thus, can provide more excellent shutdown effect. Since both the outermost layers are a porous polypropylene layer, the shape of the separator can be maintained even when the porous polyethylene layer disposed as the intermediate layer softens or melts. In addition, since the porous polypropylene layer faces the positive electrode, the oxidation of the surface of the separator can be inhibited.

When the electrode group has two or more rounds of separator portion formed by winding, the stress applied to the separator portion is particularly increased, resulting in an increased frictional resistance between the separator surfaces. Even in such a case, by using the separator of the present invention, the winding core can be removed from the electrode group without causing displacement or pulling of the separator. The separator portion comprises preferably 2 to 6 rounds, and more preferably 3 to 5 rounds. The number of times the electrode group is wound is, for example, 15 to 40 times, and more preferably 20 to 35 times, although it depends on the type of the battery and other factors.

In removing the winding core from the electrode group, the sandwiching by the winding core may be loosened by slightly rotating the winding core oppositely to the winding direction. The winding core may have a member with a sandwiching portion (e.g., a slit) for sandwiching the separators therein. Alternatively, the winding core may be a winding core having a pair of members for sandwiching the separators therebetween. The portions of the winding core at which the separators are sandwiched are smoothed in order to hold the separators.

There is no particular limitation on the material of the winding core, and the winding core may be made of, for example, a metal such as stainless steel, or alternatively, a plastic. The surface (particularly, the peripheral surface) of the winding core may be plated or surface-treated with a coating agent, as needed.

The separator of the present invention is also useful in forming an electrode group by using an electrode (a positive electrode and/or a negative electrode) including a large amount of active material packed therein or by winding at high tension. This is because, in such an electrode group, the adhesion between the winding core and the separator is strong, making it difficult to remove the winding core.

Although the cylindrical electrode group is described with reference to FIG. 1, the wound electrode group may be a flat electrode group whose end surface perpendicular to the winding axis is elliptic.

The electrode group 14 is dried prior to or after the insertion into the battery case 1.

FIG. 3 is a cross-sectional schematic diagram showing another embodiment of the separator 7. In FIG. 3, the separator 7 interposed between the first electrode (positive electrode) 5 and the second electrode (negative electrode) 6 is a porous polymer film having a two-layer structure composed of the porous polypropylene layer 7a and the porous polyethylene layer 7b laminated thereon. The porous polymer film has the first surface 7c facing the positive electrode 5 and the second surface 7d facing the negative electrode 6. In FIG. 3, the first surface 7c is the surface of the porous polypropylene layer 7a, and the second surface 7d is the surface of the porous polyethylene layer 7b. The first surface 7c has openings distributed thereon communicating with pores of the porous polymer film, and has an opening ratio as described above. The electrode groups can be formed by sandwiching in a winding core the end portions from which winding is started, in such state that the first surfaces 7c of the pair of separators 7 are brought into contact with the winding core, and in this state, winding the positive electrode 5, the negative electrode 6, the pair of the separators 7 around the winding core used as the axis, followed by removing the winding core.

Even when the separator 7 as above is used, since the first surface thereof is in contact with the peripheral surface of the winding core, the winding core can be smoothly removed from the wound electrode group, similarly to when the separator shown in FIG. 2 is used. In addition, since a film having a two-layer structure composed of a porous polypropylene layer and a porous polyethylene layer, an appropriate shutdown effect and an excellent thermal stability can be achieved at the same time.

The separator of the present invention can be used in various batteries including a wound electrode group. Examples of such batteries include: lithium primary batteries, such as fluorinated graphite-lithium batteries and manganese dioxide lithium batteries; and secondary batteries, such as alkaline secondary batteries and lithium ion secondary batteries. When the separator is made of a polymer having propylene as its constituent unit or a polymer containing an ethylene unit as its base, because of its excellent thermal stability and shutdown property, it is particularly suitably used for secondary batteries which undergo repeated charging and discharging. Among the secondary batteries, it is suitably used for lithium ion secondary batteries, because the above polymers have higher affinity for non-aqueous electrolyte than for aqueous electrolyte.

In the following, each component of the battery of the present invention is described in more detail.

(First Electrode and Second Electrode)

The first electrode may be either a positive electrode or a negative electrode. The second electrode is an electrode having a polarity opposite to that of the first electrode.

(Positive Electrode)

The positive electrode has at least a positive electrode active material layer. Depending on the type of the battery, the positive electrode may include a positive electrode current collector and a positive electrode active material layer adhering to the surface of the positive electrode current collector. The positive electrode has a belt-like shape. In a preferred embodiment, the positive electrode includes a belt-like positive electrode current collector and a positive electrode active material layer adhering to the surface of the positive electrode current collector.

The positive electrode current collector may be any commonly used metal foil, depending on the type of the battery and other factors. For example, for a lithium ion secondary battery, aluminum or an alloy thereof is preferably used in view of the processability and practical strength.

The positive electrode active material layer may contain, in addition to the positive electrode active material, for example, a conductive agent, a binder, and a thickener. The positive electrode active material may be any commonly used active material, depending on the type of the battery. For example, for a lithium ion secondary battery, a lithium-containing transition metal compound capable of receiving lithium ions as a guest may be used. Examples of the compound include: a composite metal oxide of lithium and at least one metal selected from the group consisting of cobalt, manganese, nickel, chromium, iron and vanadium, such as $LiCoO_2$, $LiMn_2O_4$, $LiNiO_2$, $LiCo_xNi_{(1-x)}O_2$ where $0<x<1$, $LiCo_yM_{1-y}O_2$ where $0.6 \leq y<1$, $LiNi_zM_{1-z}O_2$ where $0.6 \leq z<1$, $LiCrO_2$, $\alpha LiFeO_2$, and $LiVO_2$. In the above compositional formulae, M is at least one element selected from the group consisting of Na, Mg, Sc, Y, Mn, Fe, Co, Ni, Cu, Zn, Al, Cr, Pb, Sb and B (in particular, Mg and/or Al). These positive electrode active materials may be used singly or in combination of two or more.

The binder may be any binder, as long as it can be dissolved or dispersed in a dispersion medium by kneading and has little influence on the battery characteristics. Examples of the binder include fluorocarbon resins, rubbers, and acrylic polymers or vinyl polymers (e.g., a single polymer or copolymer of a monomer(s), the monomer(s) being exemplified by an acrylic monomer, such as methyl acrylate and acrylonitrile, and a vinyl monomer, such as vinyl acetate). Examples of the fluorocarbon resins include polyvinylidene fluoride, a copolymer of vinylidene fluoride and hexafluoropropylene, and polytetrafluoroethylene. Examples of the rubbers include acrylic rubber, modified acrylonitrile rubber, and styrene-butadiene rubber. These binders may be used singly or in combination of two or more. The binder may be used in the form of a dispersion in which the binder is dispersed in a dispersion medium.

Examples of the conductive agent include: carbon blacks, such as acetylene black, Ketjen black, channel black, furnace black, lamp black, and thermal black; various graphites, such as natural graphite and artificial graphite; conductive fibers, such as carbon fibers and metal fibers.

Examples of the thickener include ethylene-vinyl alcohol copolymer and cellulose derivatives (e.g., carboxymethyl cellulose and methyl cellulose).

The dispersion medium may be any dispersion medium, as long as it can be dissolved or dispersed therein, and may be either an organic solvent or water (including hot water), depending on the affinity of the binder for the dispersion medium. Examples of the organic solvent include N-methyl-2-pyrrolidone; ethers, such as tetrahydrofuran; ketones, such as acetone, methyl ethyl ketone, and cyclohexanone; amides, such as N,N-dimethylformamide and dimethylacetamide; sulfoxides, such as dimethylsulfoxide; and tetramethyl urea. These dispersion mediums may be used singly or in combination of two or more.

The positive electrode active material layer can be formed by kneading a positive electrode active material, and, as needed, a binder, a conductive agent and/or a thickener, together with a dispersion medium, to prepare a material mixture in a slurry state, and allowing the material mixture to adhere to a positive electrode current collector or a base material. Specifically, the material mixture is applied onto the surface of the positive electrode current collector or the base material by a known coating method, followed by drying, and, as needed, rolling, whereby the positive electrode active material layer can be formed. On part of the positive electrode current collector, a portion where no positive electrode active material layer is formed and the surface of the current collector is exposed is provided, and, to this exposed portion, a positive electrode lead is welded. The positive electrode is preferably excellent in flexibility.

In kneading the material mixture into a slurry state, other materials such as various dispersion mediums, surfactants, and stabilizers may be added.

The positive electrode active material layer may be formed on one surface or both surfaces of the positive electrode current collector (or the base material).

The thickness of the positive electrode is, for example, 70 to 250 µm, and preferably, 100 to 200 µm.

(Negative Electrode)

The negative electrode has at least a negative electrode active material layer. Depending on the type of the battery, the negative electrode may have a negative electrode current collector and a negative electrode active material layer adhering to the surface thereof. Alternatively, the negative electrode may be formed only of a negative electrode active material layer. The negative electrode may have a belt-like shape. In a preferred embodiment, the negative electrode includes a belt-like negative electrode current collector and a negative electrode active material layer adhering to the surface of the negative electrode current collector.

The negative electrode current collector may be any commonly used metal foil, depending on the type of the battery and other factors. For example, for a lithium ion secondary battery, a copper foil or a copper alloy foil is preferably used in view of the processability and the practical strength. The current collector may be a rolled foil or an electrolytic foil. Alternatively, the current collector may be a perforated foil, an expanded material, or a lath.

The negative electrode active material layer may contain in addition to the negative electrode active material, for example, a conductive agent, a binder, and a thickener. Any commonly used active material may be used as the negative electrode active material, depending on the type of the battery. For example, for a lithium ion secondary battery, a material having a graphite crystal structure capable of reversibly absorbing and releasing lithium ions, for example, a carbon material, such as natural graphite, spherical or fibrous artificial graphite, non-graphitizable carbon (hard carbon), and graphitizable carbon (soft carbon), may be used. In particular, a carbon material having a graphite crystal structure in which the interplanar spacing (d002) between lattice planes (002) is 0.3350 to 0.3400 nm is preferred. Further, silicon; silicon-containing compounds, such as a silicon oxide and silicide; and lithium alloys or various materials with alloy composition containing at least one selected from the group consisting of tin, aluminum, zinc and magnesium may be used.

Examples of the binder, conductive agent, thickener and dispersion medium are the same as those listed for the positive electrode.

The negative electrode active material layer can be formed by a known method. For example, the negative electrode active material layer may be formed by depositing the negative electrode active material on the surface of the current collector, by a vapor phase method, such as vacuum vapor deposition, sputtering, and ion plating, depending on the type of the negative electrode active material. Alternatively, it may be formed in a similar manner as used for forming the positive electrode active material layer, by using a material mixture in a slurry state containing a negative electrode active material, a binder, and, as needed, a conductive agent.

The negative electrode is preferably excellent in flexibility.

The negative electrode active material layer may be formed on one surface or both surfaces of the negative electrode current collector.

The thickness of the negative electrode is, for example, 100 to 250 µm, and preferably, 110 to 210 µm.

The electrolyte to be accommodated together with the electrode group in the battery case may be any commonly used electrolyte in a liquid or solid state, depending on the type of the battery. The liquid electrolyte contains a solvent and salts dissolved therein. The liquid electrolyte may be an aqueous electrolyte or a non-aqueous electrolyte, depending on the type of the battery. For example, in a lithium primary battery and a lithium ion secondary battery, a non-aqueous electrolyte is used.

A non-aqueous electrolyte used in a lithium primary battery and a lithium secondary battery is prepared by dissolving a lithium salt in a non-aqueous solvent. Examples of the non-aqueous solvent include: cyclic carbonates, such as ethylene carbonate, propylene carbonate, and butylene carbonate; chain carbonates, such as dimethyl carbonate, ethyl methyl carbonate, and diethyl carbonate; lactones, such as γ-butyrolactone; halogenated alkanes, such as 1,2-dichloroethane; alkoxyalkanes, such as 1,2-dimethoxyethane; ketones, such as 4-methyl-2-pentanone; ethers, such as 1,4-dioxane and tetrahydrofuran; nitriles, such as acetonitrile; sulfolane, 3-methyl-sulfolane; dimethylformamide; dimethylsulfoxide; alkyl phosphates, such as trimethylphosphate. These non-aqueous solvents may be used singly or in combination of two or more.

Examples of the lithium salt include lithium salts with strong electron-withdrawing properties, such as $LiPF_6$, $LiBF_4$, $LiClO_4$, $LiAsF_6$, $LiCF_3SO_3$, $LiN(SO_2CF_3)_2$, $LiN(SO_2C_2F_5)_2$, and $LiC(SO_2CF_3)_3$. These lithium salts may be used singly or in combination of two or more. The concentration of the lithium salt in the non-aqueous electrolyte is, for example, 0.5 to 1.5 M.

Any commonly used additive may be added to the electrolyte, as needed. For example, vinylene carbonate, cyclohexylbenzene, and modified forms of these may be used for a lithium ion secondary battery in order to form a favorable coating on the positive and negative electrodes. As an additive that works when the battery is overcharged, for example, terphenyl, cyclohexylbenzene, and diphenyl ether may be used. These additives may be used singly or in combination of two or more. The content of the additive(s) is not particularly limited, but is, for example, about 0.05 to 10 wt % of the total amount of the non-aqueous electrolyte.

The battery case may be of any material or shape, depending on the type of the battery. The battery case is usually made of metal. In view of the strength against pressure, the battery case is preferably made of an aluminum alloy containing a slight amount of metal, such as manganese and copper, or a steel plate with an inexpensive nickel plating applied thereto. The battery case may be of any shape such as a cylindrical shape and a prismatic shape, depending on the shape of the electrode group. The separator of the present invention is suitably applicable, for example, for a high capacity cylindrical 18650 lithium ion secondary battery. The nominal capacity of this 18650 battery is 1800 mAh or more, and preferably 2000 mA of more.

EXAMPLES

The present invention is specifically described below with reference to Examples and Comparative Example. It should be noted that the present invention is not limited to the following Examples.

Example 1

A cylindrical lithium ion secondary battery (Battery A) including a wound electrode group as shown in FIG. 1 is produced. This battery is a 18650 battery of 18.1 mm in diameter and 65.0 mm in height, with a nominal capacity of 2600 mAh. For a battery case 1, a metal case (diameter: 17.8 mm, overall height: 64.8 mm) obtained by pressing a nickel-plated steel plate (thickness: 0.20 mm) was used.

A non-aqueous electrolyte was prepared by dissolving $LiPF_6$ at a concentration of 1.0 M in a mixed solvent of ethylene carbonate and ethyl methyl carbonate (2:1 in volume ratio), and adding cyclohexylbenzene at a concentration of 0.5 wt %.

The wound electrode group was produced as described below in (1) to (4).

(1) Production of Separator

A separator 7 (thickness: 20 μm) as shown in FIG. 2 having a three-layer structure including a porous polyethylene layer 7b disposed as an intermediate layer and porous polypropylene layers 7a disposed as a pair of outermost layers sandwiching the intermediate layer was formed.

Specifically, a porous polypropylene film was prepared by stretching an unstretched polypropylene film at elevated temperature, while the conditions for stretching were adjusted so that the ratio of the total area of openings (i.e., the opening ratio) of the surface of the resultant porous polypropylene film became 90%. The resultant porous polypropylene film had an opening diameter range of 3 to 15 μm, a porosity of 38%, and a thickness of 5 μm. Two porous polypropylene films were prepared, and a porous polyethylene film (porosity: 38%, thickness: 10 μm) was sandwiched between these films and thermally fused together, whereby a laminated film was obtained. The obtained laminated film was cut in the size of 61 mm in width, to form a long roll of the separator 7. The dynamic coefficient of friction on the surface of the resultant separator was 0.27.

The opening ratio, the opening diameter range, and the dynamic coefficient of friction on the surface of the porous polypropylene film were measured in the following manner.

(Opening Ratio)

The surface of the separator (i.e., the surface of the porous polypropylene film) was photographed under a scanning electron microscope (SEM). The obtained image data of a predetermined region (0.12 mm×0.12 mm) was thresholded into openings A on the surface of the separator and a non-opening region B other than A. On the basis of the obtained data, the ratio of the total area of the openings A to the area of the predetermined region was calculated as a percentage.

(Opening Diameter Range)

A predetermined region of the surface of the separator (the surface of the porous polypropylene layer) was photographed under an SEM, and based on the obtained SEM image, the opening diameter range was determined in the manner as described above.

(Dynamic Coefficient of Friction)

The dynamic coefficient of friction on the surface of the separator 7 was measured by the method specified in JIS K7125.

(2) Production of Positive Electrode 5

To an appropriate amount of N-methyl-2-pyrrolidone, 100 parts by weight of lithium cobalt oxide serving as a positive electrode active material, 2 parts by weight of acetylene black serving as a conductive agent, and 3 parts by weight of polyvinylidene fluoride were added and kneaded together, to prepare a material mixture in a slurry state in which these components were dispersed. This slurry was applied onto both surfaces of a belt-like aluminum foil (thickness: 15 μm), and dried. Subsequently, rolling was performed a few times at a line pressure of 1000 kgf/cm (9.8 kN/cm), so that the thickness was adjusted to 180 μm. The rolled product was cut in the size of 57 mm in width and 620 mm in length, to produce a positive electrode 5 having a positive electrode active material layer on both surfaces thereof.

To an exposed portion of the aluminum foil where no material mixture was applied, a positive electrode lead terminal 5a made of aluminum was ultrasonically welded. At the ultrasonically welded portion, an insulating tape made of polypropylene resin was applied to cover the positive electrode lead terminal 5a.

(3) Production of Negative Electrode 6

To an appropriate amount of water, 100 parts by weight of flake graphite being capable of absorbing and releasing lithium and serving as a negative electrode active material, 1 part by weight (solid content) of an aqueous dispersion of styrene butadiene rubber serving as a binder, and 1 part by weight of a sodium salt of carboxymethyl cellulose serving as a thickener were added and kneaded together, to prepare a material mixture in a slurry state in which these components were dispersed. This slurry was applied onto both surfaces of a belt-like copper foil (thickness: 10 μm), and dried at 110° C. for 30 minutes. Subsequently, rolling was performed a few times at a line pressure of 110 kgf/cm (1.08 kN/cm), so that the thickness was adjusted to 174 μm. The rolled copper foil with the dried slurry thereon was cut in the size of 59 mm in width and 645 mm in length, to produce a negative electrode 6 having a negative electrode active material layer on both surfaces thereof.

To an exposed portion of the copper foil where no material mixture was applied, a negative electrode lead terminal 6a made of nickel was resistance-welded. At the resistance-welded portion, an insulating tape made of polypropylene resin was applied to cover the negative electrode lead terminal 6a.

(4) Formation of Electrode Group 14

The positive electrode 5, the negative electrode 6, and the separators 7 for providing insulation therebetween were wound spirally to form an electrode group 14. The end portions of the separators in the longitudinal direction thereof were protruded by 35 to 40 mm from the ends of the positive electrode 5 and the negative electrode 6. Prior to winding, the protruded end portions of the separators were sandwiched in a winding core (material: SUS), and winding was performed with the winding core being used as the winding axis, while the separators were transferred by a roller, thereby to form a spirally wound electrode group 14. Upon completion of winding, the other ends of the separators were cut, and the sandwiching by the winding core was loosened, to remove the winding core from the electrode group. Here, a portion of the electrode group 14 comprising the innermost round to the third round is referred to as a separator portion 16 which is composed only of the separators with neither the positive electrode nor the negative electrode being interposed between the separators. The length of each separator was 820 to 850 mm. Three hundred electrode groups 14 were produced in total, and used for producing lithium ion secondary batteries.

Example 2 and Comparative Example 1

Separators having a three-layer structure were produced in the same manner as in Example 1, except that the opening ratio and the opening diameter range of the surface of the porous polypropylene film were changed to the values shown in Table 1. Except that each separator thus produced was used, three hundred electrode groups were formed for each example in the same manner as in Example 1. The electrode group(s) which has been formed while the separators were not transferred appropriately by the roller in the winding and thus has winding displacement due to improper winding of the separator were excluded, and the remaining electrode groups were used to produce Batteries B to L. In Table 1, the number of the electrode groups excluded due to improper winding out of three hundred electrode groups is shown in the column of "improper winding".

The opening ratio and the opening diameter range were controlled by adjusting the conditions for stretching the porous polypropylene film. The thickness of the separator 7 was all 20 μm. Batteries G to L were of Comparative Example.

(Leakage Inspection)

The lithium ion secondary batteries of Examples and Comparative Example were inspected for current leakage.

The leakage inspection was performed before injecting the non-aqueous electrolyte, by applying a high voltage (250 V) across the positive electrode lead terminal and the battery case serving as the negative electrode terminal, to obtain a current waveform, from which leakage of current was detected. It was judged that leakage had occurred only when the current waveform measured in the inspection fell outside a predetermined range of good products.

The evaluation results are shown in Table 1. The occurrence rate of leakage is represented by the number of batteries in which leakage had occurred, with respect to the total number of the lithium ion secondary batteries produced.

TABLE 1

| Battery | Opening ratio (%) | Opening diameter range (μm) | Improper winding | Leakage Number of batteries | % | Dynamic coefficient of friction |
|---|---|---|---|---|---|---|
| G | 85 | 3 to 15 | 0/300 | 5/300 | 1.67 | 0.32 |
| H | 85 | 1 to 30 | 0/300 | 8/300 | 2.67 | 0.32 |
| I | 85 | 0.5 to 60 | 0/300 | 19/300 | 6.33 | 0.32 |
| A | 90 | 3 to 15 | 0/300 | 0/300 | 0 | 0.27 |
| B | 90 | 1 to 30 | 0/300 | 4/300 | 1.33 | 0.27 |
| C | 92 | 3 to 15 | 0/300 | 0/300 | 0 | 0.22 |
| D | 92 | 1 to 30 | 0/300 | 2/300 | 0.67 | 0.22 |
| E | 95 | 3 to 15 | 0/300 | 0/300 | 0 | 0.18 |
| F | 95 | 1 to 30 | 0/300 | 3/300 | 1 | 0.18 |
| J | 98 | 3 to 15 | 47/300 | 0/253 | 0 | 0.08 |
| K | 98 | 1 to 30 | 36/300 | 1/264 | 0.38 | 0.08 |
| L | 98 | 0.5 to 60 | 15/300 | 2/285 | 0.70 | 0.08 |

As shown in Table 1, in Batteries A to F of Examples, the occurrence of improper winding and leakage was remarkably reduced. The reason why the occurrence of leakage was reduced in Examples is presumably because that the dynamic coefficient of friction on the separator surface was reduced to an appropriate level. Presumably, as a result, it was possible to remove the winding core smoothly upon completion of winding, and to prevent the separator portion 16 from which winding had been started, from being displaced in the direction along which the winding core was removed, or being damaged. After the leakage inspection, the battery in which no current leakage had been observed was disassembled, and the separator portion 16 from which winding had been started was visually inspected. As a result, neither the evidence of displacement of the separator portion 16 in the direction along which the winding core was removed, nor the evidence of the damage of the separator portion 16 was found.

In Examples, the surfaces of the separators did not excessively slip on the roller, and no improper winding was observed. In other words, the separators of Examples have, at their surfaces, a good balance between an appropriate slippage property with respect to the winding core and an appropriate resistance to slippage with respect to the roller, and thus have an appropriate slippage property required for forming an electrode group.

In contrast to the results of Examples, Batteries G to I of Comparative Example had an opening ratio at the surface of the separator of 85%, and exhibited a high occurrence rate of leakage. This is presumably because the small opening ratio at the surface of the separator increased the dynamic coefficient of friction, making it impossible to remove the winding core smoothly from the electrode group after winding. After the leakage inspection, the battery in which current leakage had been observed was disassembled, and the separator portion 16 from which winding had been started was visually inspected. As a result, the separator portion 16 was displaced in the direction along which the winding core was removed, or damaged. From this result, it is presumed that current leakage had occurred at the portion from which winding had been started.

In Batteries J to L of Comparative Example in which the opening ratio at the surface of the separator was 98%, and the dynamic coefficient of friction thereof was low, the components of the electrode group (the separator, positive electrode and/or negative electrode) were displaced when wound due to the low dynamic coefficient of friction, and the occurrence rate of improper winding was significantly increased, although the occurrence rate of leakage was comparatively low. The reason why the occurrence rate of improper winding was increased is presumably because, since the slippage property of the separator surface was too good, slippage occurred between the roller and the surface of the separator, and the separator was not transferred smoothly by the roller and thus was not wound smoothly.

In Examples and Comparative Example, the narrower the opening diameter range was, the lower the occurrence rate of leakage was. This is presumably because the more uniform the distribution of the opening diameter is, the more uniform the distribution of the non-opening portion on the surface of the separator is, which makes the surface slippage property uniform. In other words, since portions at which the slippage property is low and those at which the slippage property is high can be formed uniformly, the winding core can be removed smoothly, and therefore, the separator portion 16 is prevented from being displaced in the removal direction.

The above results show that the condition of the surface of the separator has a great influence on the removability of the winding core and the winding property of the electrode group, and can be one of the causes of defects of the wound electrode group. As such, by controlling the condition of the surface of the separator, the occurrence rate of defects in producing an electrode group or battery can be reduced. In short, it is important in the present invention to control the surface condition of the separator. Although examples using a separator having a three-layer structure were mentioned in the above Examples, a separator having a single layer structure, or a separator having a multilayer structure such as a two-layer structure or a four- or more-layer structure can be used with similar effects.

Although a cylindrical lithium ion secondary battery was used in the above Examples, various batteries including a wound electrode group, for example, prismatic batteries, or primary batteries and other secondary batteries such as alkaline storage batteries, can be used with similar effects.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

INDUSTRIAL APPLICABILITY

The separator for a battery according to the present invention is useful for being used in a battery including a wound electrode group, such as a lithium ion secondary battery.

| [Reference Signs List] | |
|---|---|
| 1 | Battery case |
| 2 | Sealing plate |
| 5 | First electrode (positive electrode) |
| 5a | Positive electrode lead terminal |
| 6 | Second electrode (negative electrode) |
| 6a | Negative electrode lead terminal |
| 7 | Separator |
| 7a | Porous polypropylene layer |
| 7b | Porous polyethylene layer |
| 8 | Step portion |
| 9 | Lower insulating plate |
| 12 | Positive electrode terminal |
| 13 | Gasket |
| 14 | Electrode group |
| 16 | Separator portion |

The invention claimed is:

1. A separator for a battery, wherein:
at least one outer surface of the separator is made of a porous polymer film,
the at least one outer surface has openings distributed thereon communicating with pores of the porous polymer film,
a ratio of a total area of the openings to a total area of the at least one outer surface is 89% or more and 96% or less, and
a dynamic coefficient of friction on the at least one outer surface is 0.05 to 0.4.

2. The separator for a battery in accordance with claim 1, wherein the ratio of the total area of the openings is 90% or more and 95% or less.

3. The separator for a battery in accordance with claim 1, wherein diameters of the openings are within the range of 0.8 μM or more and 40 μm or less.

4. The separator for a battery in accordance with claim 3, wherein the diameters of the openings are within the range of 1 μm or more and 30 μm or less.

5. The separator for a battery in accordance with claim 1, wherein a region with a predetermined thickness including at least the at least one outer surface of the porous polymer film comprises at least one selected from the group consisting of polypropylene, and a copolymer of propylene and another copolymerizable monomer.

6. The separator for a battery in accordance with claim 1, wherein the porous polymer film is a multilayer film including a porous polypropylene layer, and a layer having the at least one outer surface is the porous polypropylene layer.

7. The separator for a battery in accordance with claim 6, wherein the multilayer film further includes a porous polyethylene layer laminated on the porous polypropylene layer.

8. The separator for a battery in accordance with claim 6, wherein the multilayer film has three or more layers including a pair of outermost layers and one or two or more intermediate layers interposed between the pair of outermost layers, and the layer having the first surface is the porous polypropylene layer.

9. The separator for a battery in accordance with claim 8, wherein at least one of the intermediate layers is a porous polyethylene layer.

10. The separator for a battery in accordance with claim 6, wherein the porous polypropylene layer comprises at least one selected from the group consisting of polypropylene, and a copolymer of propylene and another copolymerizable monomer.

11. The separator for a battery in accordance with claim 6, wherein a thickness of the multilayer film is 10 μm or more and 35 μm or less, and a thickness of the porous polypropylene layer is 10% or more and 40% less of the thickness of the multilayer film.

12. A battery comprising:
an electrode group formed by spirally winding a first electrode, a second electrode, and a pair of separators insulating the first electrode from the second electrode, with end portions of the separators protruded from ends of the first electrode and the second electrode being sandwiched in a winding core with a peripheral surface of the winding core being in contact with a first surface of one of the separators, and by removing the winding core; and
a non-aqueous electrolyte, wherein:
the first electrode and the second electrode each include a belt-like current collector and an active material layer adhering to a surface of the current collector,
the separator includes a porous polymer film having a first surface facing the first electrode and a second surface facing the second electrode and being opposite to the first surface,
the first surface has openings distributed thereon communicating with pores of the porous polymer film,
a ratio of a total area of the openings to an area of the first surface is 89% or more and 96% or less,
a dynamic coefficient of friction on the at least one outer surface is 0.05 to 0.4, and
an inner surface of an innermost round of the electrode group is the first surface of the separator.

13. The battery in accordance with claim 12, wherein the electrode group has two or more rounds comprising the pair of separators and including neither the first electrode nor the second electrode, near a winding axis.

14. A method for producing a battery, comprising the steps of:
preparing a first electrode including a belt-like first current collector and a first active material layer adhering to a surface of the first current collector, and a second electrode including a belt-like second current collector and a second active material layer adhering to a surface of the second current collector;
preparing a pair of belt-like separators each including a porous polymer film, the porous polymer film having a first surface facing the first electrode and a second surface facing the second electrode and being opposite to the first surface, in which the first surface has openings distributed thereon communicating with pores of the porous polymer film, a ratio of the total area of the openings to the area of the first surface is 89% or more and 96% or less, and a dynamic coefficient of friction on the at least one outer surface is 0.05 to 0.4;
forming an electrode group by winding spirally the first electrode, the second electrode, and the separators, with the first electrode and the second electrode being arranged so as to be insulated from each other by the separators, end portions of the separators protruded from ends of the first electrode and the second electrode being sandwiched in a winding core, and the first surface of one of the separators being in contact with a peripheral surface of the winding core;
removing the winding core from the electrode group; and
placing the electrode group in a battery case, together with a non-aqueous electrolyte.

15. The separator for a battery in accordance with claim 1, wherein diameters of the openings are within the range of 3 μm or more and 15 μm or less.

16. The separator for a battery in accordance with claim 1, wherein the ratio of the total area of the openings is 91% or more and 96% or less.

* * * * *